United States Patent [19]

Yoshimura

[11] 4,385,676

[45] May 31, 1983

[54] FUEL FEED SYSTEM FOR CARBURETORS ON MOTORCYCLES

[75] Inventor: Shigekazu Yoshimura, Asaka, Japan

[73] Assignee: Honda Giken Kogyo Kabushiki Kaisha, Tokyo, Japan

[21] Appl. No.: 254,163

[22] Filed: Apr. 14, 1981

[30] Foreign Application Priority Data

Apr. 22, 1980 [JP] Japan ............................ 55-53986[U]

[51] Int. Cl.3 ............................ B60K 5/02; F02B 1/00

[52] U.S. Cl. .................................... 180/219; 123/576; 123/179 G; 280/5 A

[58] Field of Search ............... 123/575, 576, 577, 578, 123/179 G, 1 A; 280/5 R, 5 A, 202; 180/219

[56] References Cited

U.S. PATENT DOCUMENTS

| | | | |
|---|---|---|---|
| 3,014,474 | 12/1961 | Banker | 123/575 |
| 3,775,978 | 12/1973 | Body | 123/1 A |
| 3,937,484 | 2/1976 | Morioka et al. | 180/219 |
| 4,031,864 | 6/1977 | Crothers | 123/575 |
| 4,056,087 | 11/1977 | Boyce | 123/576 |

*Primary Examiner*—Charles J. Myhre

*Assistant Examiner*—E. Rollins Cross

*Attorney, Agent, or Firm*—Armstrong, Nikaido, Marmelstein & Kubovcik

[57] ABSTRACT

A system for feeding a fuel to a carburetor on a motorcycle, comprising a frame on which an engine having a carburetor is mounted, a main fuel tank disposed at the front side of an upper portion of the frame for storing fuel such as alcohol therein, and an auxiliary fuel tank disposed at the rear side of the upper portion of the frame for storing fuel such as gasoline therein. The main and auxiliary fuel tanks are in communication with the carburetor through main and auxiliary fuel passages, respectively. A switch cock is provided in the main fuel passage for opening and closing thereof, and a measuring pump is interposed in the auxiliary fuel passage for supplying an auxiliary fuel at a predetermined flow rate from the auxiliary fuel tank to the carburetor. The switch cock and measuring pump are disposed at opposite sides of a lower surface of the main fuel tank. Accordingly, a driver on the motorcycle can easily reach and operate the switch cock and measuring pump in his sitting posture on the motorcycle.

3 Claims, 3 Drawing Figures

FUEL FEED SYSTEM FOR CARBURETORS ON MOTORCYCLES

BACKGROUND OF THE INVENTION

1. Field of the Invention

This invention relates to a fuel feed system for carburetors on motorcycles, which comprises a main fuel tank for storing alcohol therein, a main fuel passage for communicating the main fuel tank with a carburetor, a switch cock provided at an intermediate portion of the main fuel passage, an auxiliary fuel tank for storing gasoline therein, an auxiliary fuel passage for communicating the auxiliary fuel tank with the carburetor, and a measuring pump provided at an intermediate portion of the auxiliary fuel passage, whereby the fuels stored in the main and auxiliary fuel tanks are fed to the carburetor by operating the switch cock and the measuring pump, respectively.

2. Description of the Prior Art

In a fuel feed system for carburetors on motorcycles, a main fuel tank is provided at a front side of an upper portion of a main frame of a motorcycle, and an auxiliary fuel tank at a rear side of the upper portion of the main frame. The main fuel tank is communicated with a carburetor via a main fuel passage provided with a switch cock at an intermediate portion thereof. The auxiliary fuel tank is communicated with the carburetor via an auxiliary fuel passage provided with a measuring pump at an intermediate portion thereof. A main fuel such as alcohol is normally supplied from the main fuel tank to the carburetor so as to operate the engine. When it is necessary to improve the engine-starting conditions, for example, at a low temperature, the measuring pump may be operated to supply an auxiliary fuel such as gasoline from the auxiliary fuel tank to the carburetor. In order to allow a rider on the motorcycle to operate the switch cock and measuring pump as he sits on a seat thereof, it is desirable that the switch cock and measuring pump be disposed within the area that the rider can reach them in his seated position and in such a manner that the switch cock and measuring pump may not be obstacles to action of the rider.

The measuring pump is preferably a diaphragm type pump. A diaphragm and an actuator rod in a conventional diaphragm type pump are joined together by sandwiching the diaphragm at its central movable portion between a pair of holding plates, and caulking the actuator rod to these holding plates. In this structure, the diaphragm and actuator rod cannot be separated from each other. Accordingly, when it is necessary to repair either the diaphragm or the actuator rod by replacing it with a new one, it is also required to renew the other as well, which is still in a normal condition. It is uneconomical to use such a measuring pump. Furthermore, when the actuator rod is caulked to the holding plates, the gilt on the caulked portions thereof may come off in some cases. This results in the formation of rust on the mentioned portions of the actuator rod and holding plates, and the rust would be mixed in a treating liquid.

SUMMARY OF THE INVENTION

Therefore, a primary object of this invention is to provide a compact fuel feed system of the above-mentioned type for carburetors on motorcycles, having a switch cock and a measuring pump which are disposed within the area that a rider can handle them in his seat position on the motorcycle and in such a manner that the switch cock and measuring pump may not be obstacles to action of the rider on the motorcycle, thereby to allow the rider to easily operate the switch cock and measuring pump while seating on the seat.

Another object of this invention is to obtain a measuring pump of a simple construction which can be easily assembled and which is free from the above-mentioned drawbacks encountered in a conventional diaphragm type measuring pump.

To these ends, the present invention provides a fuel feed system for carburetors on motorcycles, comprising a frame on which an engine having a carburetor is mounted, a main fuel tank provided at a front side of an upper portion of the frame, an auxiliary fuel tank provided at a rear side of the upper portion of the frame, a main fuel passage for communicating the main fuel tank with the carburetor, an auxiliary fuel passage for communicating the auxiliary fuel tank with the carburetor, a switch cock provided at an intermediate portion of the main fuel passage to open and close the same fuel passage, and a measuring pump provided at an intermediate portion of the auxiliary fuel passage to supply an auxiliary fuel to the carburetor at a predetermined flow rate, the switch cock and the measuring pump being disposed at opposite sides of a lower surface of the main fuel tank.

The above and other objects as well as advantageous features of the invention will become apparent from the following description of the preferred embodiment taken in conjunction with the accompanying drawings.

DESCRIPTION OF THE PREFERRED EMBODIMENT

Figure 1:
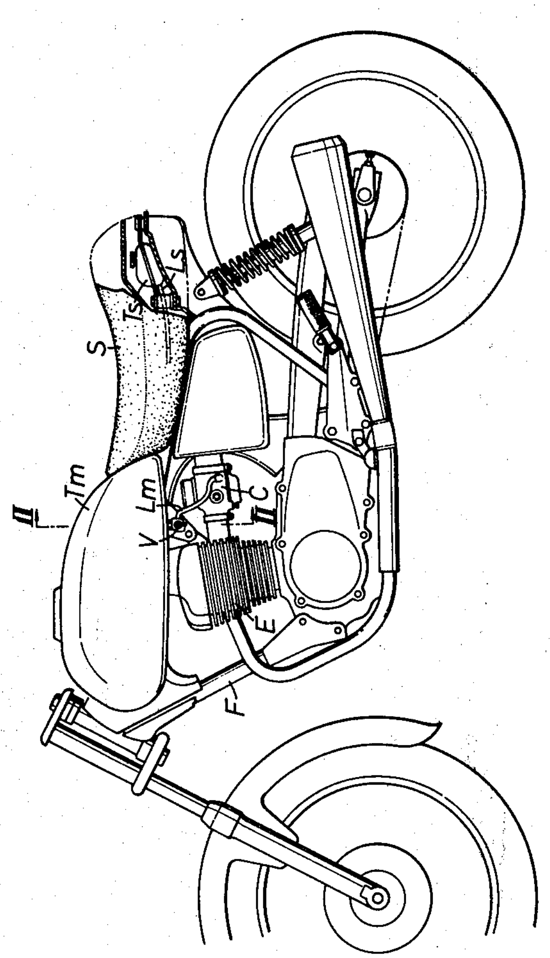
FIG. 1 is a partially cutaway side elevational view of a motorcycle provided with a fuel feed system according to the present invention.
Figure 2:
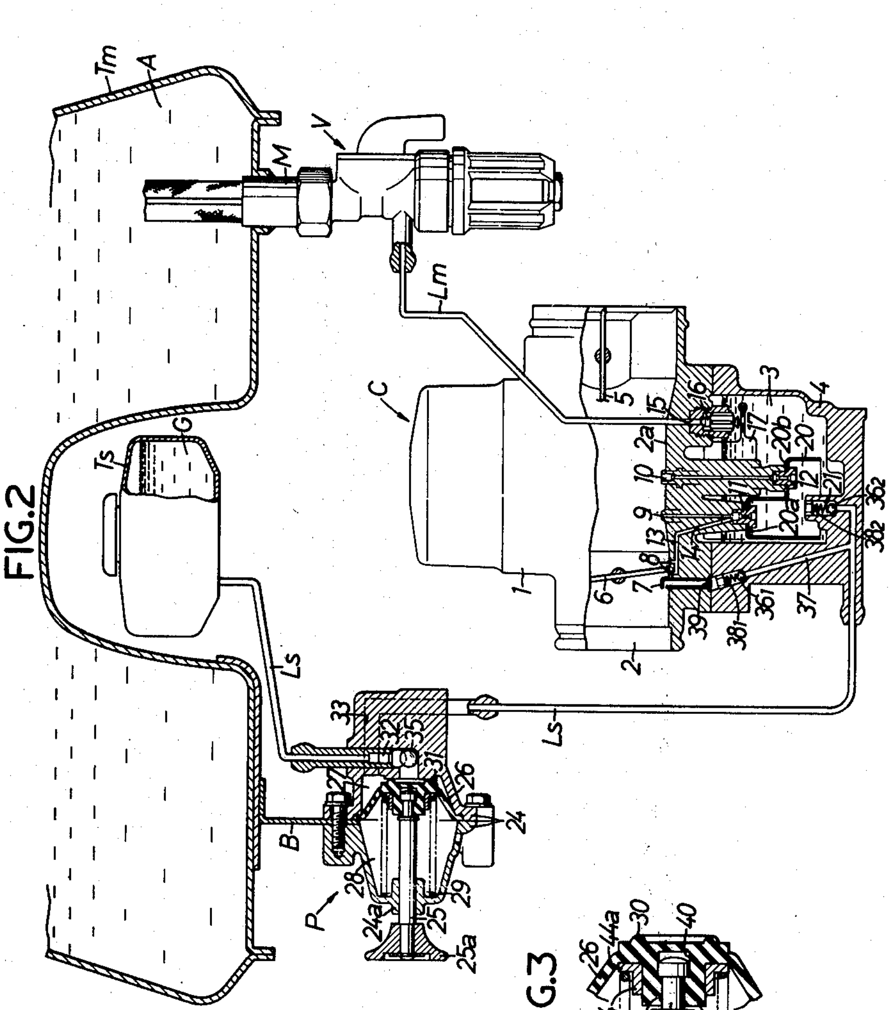
FIG. 2 is an enlarged sectional view taken along the line II—II in FIG. 1.
Figure 3:
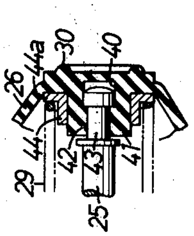
FIG. 3 is an enlarged sectional view of a principal portion of a measuring pump incorporated in the fuel feed system shown in FIG. 1.

FIG. 1 shows a motorcycle provided with a fuel feed system embodying the present invention. A main fuel tank Tm for storing therein a main fuel A such as alcohol is provided at a front side of an upper portion of a frame F, and an auxiliary fuel tank Ts for storing therein an auxiliary fuel G, such as gasoline, at a rear side of the upper portion thereof. A seat S is disposed between the main fuel tank Tm and the auxiliary fuel tank Ts. An engine E is mounted on the frame F in such a manner that the engine E is positioned under the main fuel tank Tm. As clearly shown in FIG. 2, the main fuel A such as alcohol is supplied from the main fuel tank Tm to a carburetor C for the engine E via a main fuel passage Lm, which is provided at an intermediate portion thereof with a known switch cock V having three control positions, "ON," "OFF" and "RESERVE." The auxiliary fuel G such as gasoline is supplied from the auxiliary fuel tank Ts to the carburetor C via an auxiliary fuel passage Ls, which is provided at an intermediate portion thereof with a measuring pump P of the present invention. The switch cock V and measuring pump P are fastened to opposite sides of a lower surface of the main fuel tank Tm via a support member M and a bracket B, respectively.

The construction of the carburetor C and measuring pump P will be described in detail hereinafter.

The carburetor C comprises a carburetor body 1 having an intake passage 2 extended horizontally through an central portion thereof, and a vessel 4 defining a float chamber 3 and joined to a lower portion of the intake passage 2.

The intake passage 2 having a central venturi portion 2*a* is provided therein with a choke valve 5 on the upstream side (right-hand side in the drawing) of the venturi portion 2*a*, and a throttle valve 6 on the downstream side thereof. A starting nozzle 7, a by-pass port 8, a primary nozzle 9, and a secondary nozzle 10 are opened into such positions in the intake passage 2 that are slightly downstream of the throttle valve 6, in the vicinity of the throttle valve 6, halfway between the throttle valve 6 and the venturi portion 2*a*, and in the venturi portion 2*a*, respectively. The primary nozzle 9 and the secondary nozzle 10 are communicated with the float chamber 3 via a primary jet 11 and a secondary jet 12, respectively. A low-speed fuel passage 13 is branched from a passage communicating the primary nozzle 9 and primary jet 11 with each other. The low-speed fuel passage 13 is communicated with the by-pass port 8. A slow jet 14 is inserted into the low-speed fuel passage 13.

A main fuel supply port 15 is opened into the lower surface of an upper wall of the float chamber 3, and a known float valve 16 is provided at the main fuel supply port 15. The float valve 16 is adapted to cooperate with a float 17 provided in the float chamber 3, to open and close the main fuel supply port 15 so that the level of a fuel oil in the float chamber 3 can be kept constant. The main fuel passage Lm referred to above is communicated with the main fuel supply port 15.

In the float chamber 3, a cup body 20 having an opening at its lower end is secured to the primary and secondary jets 11, 12, which are screwed to the lowermost portion of the carburetor body 1. The cup body 20 has a two-step horizontal wall having an upper wall portion 20*a* and a lower wall portion 20*b*. The primary jet 11 is opened at the inner surface of the upper wall portion 20*a*, and the secondary jet 12 at the inner surface of the lower wall portion 20*b*.

An auxiliary fuel supply port 21, which is opened into the cup body 20, is provided in a bottom wall of the vessel 4. The auxiliary fuel passage Ls is communicated with the auxiliary fuel supply port 21.

A starting fuel passage 37 is branched from that portion of the auxiliary fuel passage Ls which is located very closely to the auxiliary fuel supply port 21. The starting fuel passage 37 is communicated with the starting nozzle 7 referred to above.

The measuring pump P consists of a pump body 24 having a diaphragm 26 by which the interior of the pump body 24 is divided into a pump chamber 27 and an atmospheric chamber 28, an actuator rod connected to the diaphragm 26, and a return spring 29 provided in the atmospheric chamber so as to urge the diaphragm 26 toward the pump chamber 27. The actuator rod 25 is slidably supported through a boss 24*a* formed on the right end wall of the pump body 24, and a traction stroke of the actuator 25 is restricted by the boss 24*a*.

According to the present invention, the diaphragm 26 and actuator rod 25 are connected together in the following manner.

The diaphragm 26 consists of an elastic material, such as rubber. A connecting boss 41 having a blind bore 40 is formed integrally on that side surface of the central movable portion of the diaphragm 26 which faces the atmospheric chamber 28, and an annular seal bead 30 is also formed integrally on the other side surface of the diaphragm 26. An annular projection 42 is formed at an open end of the blind bore 40.

The actuator rod 25 is formed in such a manner that an inner end portion thereof can be engaged with the blind bore 40. The actuator rod 25 has in its outer circumferential surface an annular recess 43 which can be engaged with the annular projection 42 referred to above. Accordingly, when the inner end portion of the actuator rod 25 is fitted into the blind bore 40 as the connecting boss 41 is widened thereby, the recess 43 and projection 42 come into engagement with each other, so that the connecting boss 41 and actuator rod 25 are engaged with each other elastically in a locked manner. In order to maintain such locked type engagement, a cylindrical retainer 44 is fitted around the outer circumferential surface of the connecting boss 41. The retainer 44 serves to prevent the connecting boss 41 from being deformed, and also the recess 43 and projection 42 from being disengaged from each other. Thus, the actuator rod 25 can be prevented from coming out of the blind bore 40. The retainer 44 has a flange 44*a* contacting the diaphragm 26. The return spring 29 referred to above is provided between the flange 44*a* and a side surface opposed thereto of the right end wall of the atmospheric chamber 28. Accordingly, the retainer 44 is in press contact with the diaphragm 26 owing to the resilient force of the spring 29.

The actuator rod 25 is provided with a knob 25*a* at an outer end thereof. A left end wall of the pump chamber 27 is provided with a valve seat 31 which is adapted to cooperate with the seal bead 30 formed on the diaphragm 26. An inlet port 32 and an outlet port 33 extending as they sandwich the valve seat 31 therebetween are opened into the pump chamber 27. The pump chamber 27 is communicated with an upstream side portion of the auxiliary fuel passage Ls via the inlet port 32, and with a downstream side portion thereof via the outlet port 33.

A suction valve 35, a first discharge valve $36_1$ and a second discharge valve $36_2$, which belong to the measuring pump P, are provided in the inlet port 32, starting fuel passage 37 and auxiliary fuel supply port 21, respectively. A set load of a valve spring $38_1$ for the first discharge valve $36_1$ is lower than that of a valve spring $38_2$ for the second discharge valve $36_2$, so that a valve opening pressure for the first discharge valve $36_1$ is lower than that for the second discharge valve $36_2$. An orifice 39 is formed in the starting nozzle 7 for the purpose of applying a predetermined valve opening pressure to the second discharge valve $36_2$ after the first discharge valve $36_1$ has been opened. An ejection port of the starting nozzle 7 may be narrowed so as to use the starting nozzle 7 instead of the orifice 39. The suction valve 35 referred to above consists of a normally-opened valve.

The operation of the above embodiment will now be described.

In order to start the engine at a low temperature, the switch cock V is operated to open the main fuel passage Lm to introduce the alcohol fuel A from the main fuel tank Tm into the float chamber 3 until a predetermined level has been attained.

When an actuator rod 25 in the measuring pump P is then drawn outwardly, the seal bead 30 is removed from the valve seat 31. As a result, the inlet port 32 is opened, and the pressure in the pump chamber 27 is reduced due to the rightward movement of the diaphragm 26. This allows the gasoline fuel G in the auxiliary fuel tank Ts to be sucked into the pump chamber 27 through the inlet port 32. When the actuator rod 25 is then released, the diaphragm 26 is moved to left by the resilient force of the return spring 29 to increase the pressure in the pump chamber 27. In accordance with an increase in the pressure in the pump chamber 27, the suction valve 35 is closed as shown in chain line, and the first discharge valve $36_1$, which is adapted to be opened at a low pressure, is then opened. The second discharge valve $36_2$, which is adapted to be opened at a high pressure, is thereafter opened. Accordingly, the gasoline fuel G in the pump chamber 27 is ejected via the starting fuel passage 37 initially from the starting nozzle 7 into the intake passage 2, and then from the auxiliary fuel supply port 21 into the cup body 20. When the actuator rod 25 has reached the left limit with the seal bead 30 brought into contact with the valve seat 31 to close the inlet port 32, the operation of the pump P is stopped.

In the cup body 20, a part of the alcohol fuel A occupying the interior thereof is then forced out from the opening at the lower end of the cup body 20 due to the ejection pressure of the gasoline fuel G and the difference between the specific gravities of the fuels A, G, so that the oil level in the float chamber 3 exceeds a predetermined level. As a result, comparatively pure gasoline fuel G is concentrated in the uppermost portion of the interior of the cup body 20 and the concentration of the gasoline fuel G in the alcohol fuel A is decreased toward the lower end of the cup body 20.

When the choke valve 5 is then closed and the throttle valve 6 opened at a suitable opening degree for first idling, to turn a crankshaft in the engine, the gasoline fuel G, which has already been ejected from the starting nozzle 7, is drawn by the suction vacuum in the engine to be supplied thereinto. As a result, an initial explosion immediately occurs in the engine, and the suction vacuum increasing due to the explosion works greatly on the by-pass port 8 and primary nozzle 9. Consequently, the fuel consisting mainly of gasoline fuel G is sucked from the primary jet 11, which is communicated with the by-pass port 8 and primary nozzle 9, since the primary jet 11 is opened at the highest portion of the cup body 20, where the gasoline fuel G is most concentrated. The fuel thus sucked from the primary jet 11 is ejected from the port 8 and nozzle 9 to be supplied to the engine. Thus, the engine is completely exploded, so that an engine-starting operation is completed.

When the throttle valve 6 is opened soon after the engine has been started, to apply a load thereto, the suction vacuum in the engine working on the primary nozzle 9 works gradually on the secondary nozzle 10 in accordance with an increase in the opening degree of the throttle valve 6. As a result, the fuel consisting mainly of gasoline fuel G is ejected from the primary nozzle 9 as mentioned above, and a mixed fuel of gasoline and alcohol is ejected from the secondary nozzle 10 via the secondary jet 12 since the secondary jet 12, which is communicated with the secondary nozzle, is opened at an intermediate portion of the interior of the cup body 20, where a gasoline-alcohol mixture prevails. After the throttle valve 6 has been opened, the composition of fuel supplied to the engine is thus varied gradually, so that shifting of the engine operation from a non-load operation to a load operation can be carried out smoothly even when little time has passed after the starting of the engine.

When the fuel in the cup body 20 has been consumed, the alcohol fuel A in the float chamber 3 is moved thereinto from the underside thereof to dilute the gasoline fuel G. Finally, the alcohol fuel A alone occupies the interior of the cup body 20, so that the engine A comes to be operated with the normally-used alcohol fuel A.

If a traction stroke of the actuator rod 25 in the measuring pump P is adjusted in accordance with the degree of coldness in a place where the engine is started, the rate of ejection of the gasoline fuel G into the cup body 20 can be set to a suitable level. When the engine is started in a warm place, the ejection of gasoline fuel G is not necessary.

In order to discharge the content of the auxiliary fuel tank Ts therefrom for cleaning the interior thereof, the downstream end of the auxiliary fuel passage Ls is disconnected, and the actuator rod 25 is pulled to hold the valve body 30 in an opened state, so that the content of the tank Ts flows out of the passage Ls via the normally-opened suction valve 35, inlet port 32, pump chamber 27 and outlet port 33. Since the suction valve 35 consists of a normally-opened type valve, a pumping operation of the actuator rod is not necessary.

Since the switch cock V and measuring pump P in the fuel feed system according to the present invention are disposed at both sides of the lower surface of the main fuel tank Tm as mentioned above, the dead space under the main fuel tank Tm can be utilized effectively, and neither the switch cock V nor the measuring pump P obstructs a rider on the motorcycle. Moreover, the rider on the motorcycle easily reaches the switch cock V and measuring pump P as he sits on the seat, to operate the same without difficulties. Therefore, the switch cock and measuring pump P are not erroneously operated.

The measuring pump P is a diaphragm type pump. The diaphragm 26 of an elastic material in the measuring pump P is integrally formed at its central movable portion with a connecting boss 41 having a blind bore 40 therein. The actuator rod 25 is inserted at its one end into the connecting boss 41, and the boss 41 and rod 25 are connected together in such a manner that the projection formed on the inner circumferential surface of the former and the recess formed in the outer circumferential surface of the latter are elastically engaged with each other. The retainer 44 is fitted around the outer circumferential surface of the connecting boss 41 to prevent the boss 41 from being deformed. The retainer 44 is kept urged against the diaphragm 26 by the spring 29. Therefore, the diaphragm 26 and actuator rod 25 can be securely joined together by merely setting the retainer 44 and spring 29 in the above-mentioned manner, so that a troublesome caulking step, which has been used in the prior art for joining diaphragm and actuator rod together, is not required. In fact, the measuring pump used in the present invention can be assembled conveniently. Conversely, the diaphragm 26 and actuator rod 25 can be separated from each other by only removing the retainer 44 and spring 29. Therefore, even one of the diaphragm and actuator rod can be renewed for repairing the old one which has just removed.

Since the diaphragm 26 and actuator rod 25 can be joined together without using such a caulking or any other step that may causes scratches on the surface of the actuator rod 25, the gilt on the surface of the actuator rod 25 does not come off, so that rust is not formed thereon. Even if rust should be formed on the surface of the actuator rod 25, the rust does not extend to a diaphragm chamber, which is on the opposite side of the actuator rod 25 with respect to the diaphragm 26, since the actuator rod 25 is held at its inner end in the blind bore 40 as mentioned above, and not passed through the diaphragm 26. Accordingly, it is desirable that the diaphragm chamber referred to above consists of a fluid treating chamber like the pump chamber 27 of the above-described embodiment.

If the return spring for the diaphragm 26 is utilized also as the spring 29 referred to in the above paragraph, the return spring comes to perform a double service. In addition, the retainer 44 serves also as a seat for the return spring 29. This allows the number of parts of the measuring pump to be reduced to a great extent, and the construction of the pump to be simplified. In other words, the assembling efficiency of the measuring pump can be much improved.

The present invention is not, of course, limited to the above embodiment; it may be modified in various ways within the scope of the appended claims.

What is claimed is:

1. A fuel feed system for carburetors on motorcycles, comprising a frame on which an engine having a carburetor is mounted; a main fuel tank provided at a front side of an upper portion of said frame for storing alcoholic fuel to be used as a main fuel; an auxiliary fuel tank provided at a rear side of the upper portion of said frame for storing gasoline to be used as a starting fuel; a main fuel passage for connection between said main fuel tank and said carburetor, an auxiliary fuel passage for connection between said auxiliary fuel tank and said carburetor; a switch cock disposed in said main fuel passage and adapted to be manually operated to control supply of alcoholic fuel to said carburetor; and a measuring pump disposed in said auxiliary fuel passage and adapted to be manually operated to meter and supply a proper amount of gasoline from said auxiliary fuel tank to said carburetor at the time of engine starting, said switch cock and said measuring pump being disposed on opposite sides of a lower surface of said main fuel tank, said pump comprising a pump body, a diaphragm of an elastic material dividing the interior of said pump body into a pump chamber communicating with said auxiliary fuel passage, and an atmospheric pressure chamber communicating with the atmosphere, and a return spring resiliently biasing said diaphragm toward said pump chamber.

2. A fuel feed system for carburetors on motorcycles according to claim 1, wherein said measuring pump comprises a connecting boss formed integrally with a central movable portion of said diaphragm and having a blind bore, an actuator rod having an inner end portion fitted into said connecting boss for elastic engagement and the other end portion extended to the outside of said pump body, and a retainer fitted around the outer circumferential surface of said connecting boss to prevent said connecting boss from being deformed, said retainer being kept pressed against said diaphragm by said return spring.

3. A fuel feed system for carburetors on motorcycles according to claim 2, wherein said connecting rod is provided at its inner end portion with an annular recess, and said connecting boss has an annular projection for engagement with said annular recess.

* * * * *